(12) United States Patent
Yamaguchi

(10) Patent No.: US 9,950,597 B2
(45) Date of Patent: Apr. 24, 2018

(54) ROOF APPARATUS

(71) Applicant: AISIN SEIKI KABUSHISIKI KAISHA, Kariya-shi, Aichi-ken (JP)

(72) Inventor: Akinao Yamaguchi, Nagoya (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 15/402,439

(22) Filed: Jan. 10, 2017

(65) Prior Publication Data
US 2017/0210213 A1    Jul. 27, 2017

(30) Foreign Application Priority Data

Jan. 21, 2016 (JP) .................................. 2016-009842

(51) Int. Cl.
*B60J 7/043* (2006.01)
*B60J 7/04* (2006.01)

(52) U.S. Cl.
CPC ................ *B60J 7/04* (2013.01); *B60J 7/043* (2013.01)

(58) Field of Classification Search
CPC .................................... B60J 7/04; B60J 7/043
USPC ........................................... 296/216.01–224
See application file for complete search history.

(56) References Cited

U.S. PATENT DOCUMENTS

| 5,104,178 | A | * | 4/1992 | Bienert | ..................... | B60J 7/022 296/213 |
| 7,077,462 | B1 | * | 7/2006 | De Gaillard | ............. | B60J 7/022 296/193.04 |
| 2003/0047968 | A1 | * | 3/2003 | Imgram | ................... | B60J 7/022 296/216.08 |
| 2011/0204682 | A1 | | 8/2011 | Kamei et al. | | |

FOREIGN PATENT DOCUMENTS

JP          5219075          3/2013

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A roof apparatus includes: a roof panel in which an opening and a pedestal portion extending over an entire peripheral portion of the opening are formed; and a sunroof unit. The sunroof unit includes guide rails mounted on both edge portions of the pedestal portion in a width direction of a vehicle, functional components supported by the guide rails so as to be capable of moving in a front-and-rear direction of the vehicle, a movable panel supported by the functional components and opens and closes the opening in response to movements of the both functional components, and a fixed panel connecting front ends of the guide rails together in the width direction of the vehicle, mounted so as to be adjacent to the movable panel which is in a closed state, and covering a drive member which drives and moves the both functional components.

4 Claims, 3 Drawing Sheets

FRONT ← → REAR

FRONT ← → REAR

US 9,950,597 B2

ROOF APPARATUS

CROSS REFERENCE TO RELATED APPLICATIONS

This application is based on and claims priority under 35 U.S.C. § 119 to Japanese Patent Application 2016-009842, filed on Jan. 21, 2015, the entire contents of which are incorporated herein by reference.

TECHNICAL FIELD

This disclosure relates to a roof apparatus provided with a sunroof unit.

BACKGROUND DISCUSSION

In the related art, various types of apparatus have been proposed as a roof apparatus (for example, Japanese Patent No. 5219075 (Reference 1) and the like). As illustrated in FIG. 6, such a roof apparatus has a configuration in which a movable panel 91 and peripheral structures (hereinafter, referred to as a "sunroof unit 90") thereof are assembled from below a vehicle. In this case, an opening 96 of a roof panel 95, which is opened and closed by the movable panel 91, is required to have an opening amount at which at least movements of the movable panel 91 in a height direction of the vehicle are allowed. For this reason, liquid tightness is ensured by a ring-shaped sealing member 92 attached along a peripheral portion of the movable panel 91 being elastically brought, by the movable panel 91 that is in a closed state, into contact with a tubular opening end 96a of the opening 96.

In a case of such a sealing structure, the possibility of the liquid leakage occurrence relatively increases by a contact surface of the sealing member 92 and the opening end 96a being extended in the height direction of the vehicle. Thus, measures, for example, adopting a complicated drainage structure, are required to be taken. Therefore, a sunroof unit that can be assembled from above the vehicle is desired. That is because such a sunroof unit ensures that the size of the movable panel does not restrict a substantial opening amount of the opening. That is, the possibility of the liquid leakage occurrence can be relatively lowered, for example, by the ring-shaped sealing member attached along the opening end of the opening being elastically brought into contact with the lower surface of the movable panel insofar as the opening amount corresponds to an amount at which the opening fits in an inner side of the movable panel that is in a closed state.

SUMMARY

Thus, a need exists for a roof apparatus which is not susceptible to the drawback mentioned above.

A roof apparatus according to an aspect of this disclosure includes a roof panel in which an opening and a pedestal portion extending over an entire peripheral portion of the opening are formed and a sunroof unit, in which the sunroof unit has a pair of guide rails mounted on both edge portions of the pedestal portion in a width direction of a vehicle, a pair of functional components supported by the both guide rails so as to be capable of moving in a front-and-rear direction of the vehicle, a movable panel that is supported by the both functional components and opens and closes the opening in response to movements of the both functional components, and a fixed panel that connects both front ends of the both guide rails together in the width direction of the vehicle, is mounted so as to be adjacent to the movable panel which is in a closed state, and covers a drive member which drives and moves the both functional components.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Hereinafter, an embodiment of a roof apparatus will be described. Hereinafter, a front-and-rear direction of a vehicle will be referred to as "front-and-rear direction", and above and below in a height direction of the vehicle will be referred to as "above" and "below" respectively. In addition, an inner side in a width direction of the vehicle, which is a direction toward the inside of a vehicle interior will be referred to as "vehicle inner side", and an outer side in the width direction of the vehicle, which is a direction toward the outside of the vehicle interior will be referred to as "vehicle outer side".

Figure 1:
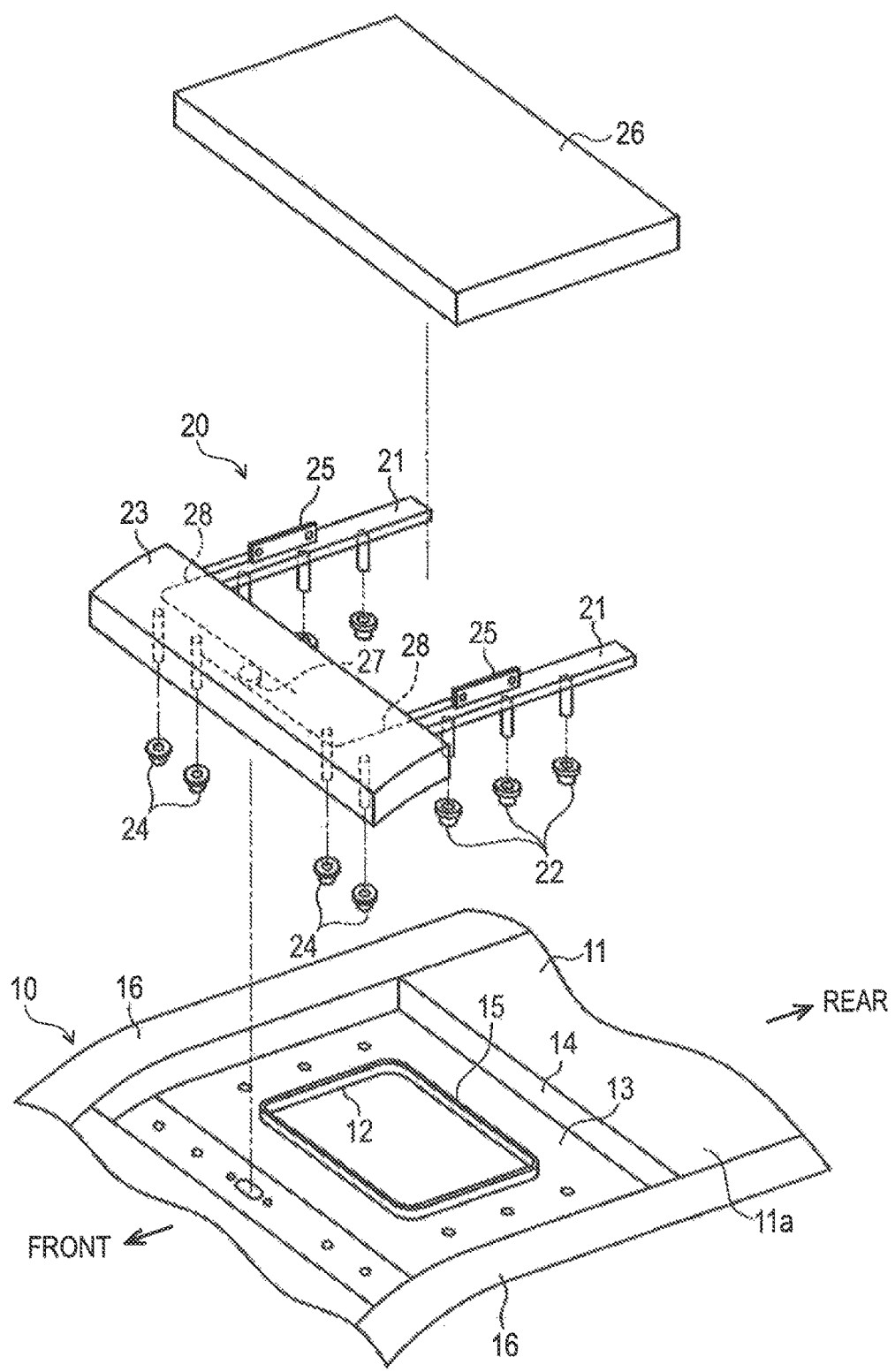
FIG. 1 is an exploded perspective view illustrating a structure of a roof apparatus according to an embodiment.

As illustrated in FIG. 1, a roof 10 of the vehicle such as an automobile is provided with a roof panel 11 that forms an outer shape thereof. In a front portion of the roof panel 11, an opening 12 is formed, and a pedestal portion 13, which is substantially shaped into a square ring, is formed over the entire peripheral portion of the opening 12. The pedestal portion 13 is disposed one step lower than a general surface 11a, which forms a design surface of the pedestal portion 13, with a step 14 being interposed therebetween. In addition, the roof panel 11 has an attaching wall 15, which is substantially shaped into a square tube and substantially extends upward over the entire periphery of the opening 12.

The roof 10 is provided with a pair of side members 16 that extend in the front-and-rear direction so as to be adjacent to the vehicle outer sides, which are both edges of the roof panel 11 in the width direction of the vehicle. Each side member 16 adjoins the general surface 11a of the roof panel 11 so as to be substantially flush with the general surface 11a. Thus, both ends of the pedestal portion 13 in the width direction of the vehicle are closed by the both side members 16 in the width direction. That is, substantially the entire periphery of the pedestal portion 13 is enclosed with the step 14 and the both side members 16.

A sunroof unit 20 is loaded on the roof panel 11 along with the pedestal portion 13. The sunroof unit 20 has a pair of guide rails 21 mounted on both edge portions of the pedestal portion 13 in the width direction of the vehicle. Each guide rail 21 is, for example, formed of an extruded member made of an aluminum alloy, has a constant section in a longitudinal direction, and extends in the front-and-rear direction.

Each guide rail 21 is fixed to the pedestal portion 13 by a plurality of fixing tools 22 arranged at an interval in the front-and-rear direction.

In addition, the sunroof unit 20 has a fixed panel 23 that is mounted on a front edge portion of the pedestal portion 13 so as to be adjacent to the pedestal portion 13. The fixed panel 23 is, for example, a long resin member that extends in the width direction of the vehicle, and connects front ends of the both guide rails 21 together in the width direction of the vehicle. The fixed panel 23 is fixed to the pedestal portion 13 by a plurality of fixing tools 24 arranged at an interval in the width direction of the vehicle.

Figure 2:
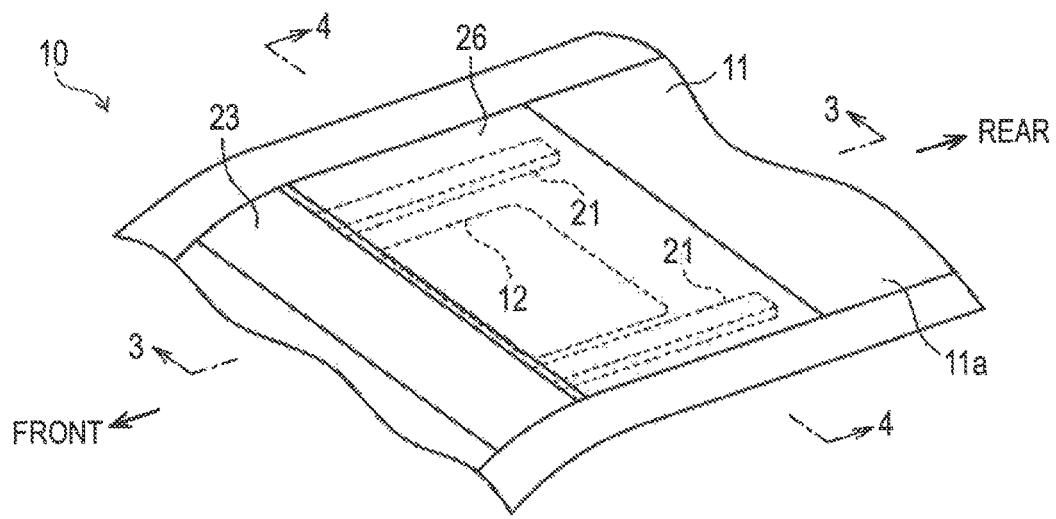
FIG. 2 is a perspective view illustrating the structure of the roof apparatus according to the embodiment.

Furthermore, the sunroof unit 20 has a pair of functional components 25 which are supported by the both guide rails 21 so as to be capable of moving in the front-and-rear direction, and has a movable panel 26 that is linked to and supported by the both functional components 25. The movable panel 26 is, for example, a glass plate substantially formed into a square, and opens and closes the opening 12 in response to the movements of the both functional components 25 in the front-and-rear direction. As illustrated in FIG. 2 as well, the movable panel 26 is disposed so as to be adjacent to a portion of the fixed panel 23 close to the rear of the vehicle in a closed state, and spreads so as to adjoin the general surface 11a of the roof panel 11, thereby being substantially flush with the general surface 11a, along with the fixed panel 23.

In addition, the sunroof unit 20 has an output gear 27 that extends in the height direction of the vehicle and that is substantially shaped into a cylinder which is pivotally supported around an axis by the fixed panel 23, and has a pair of drive belts 28 which are fitted into the output gear 27 and to which tips of the both functional component 25 are connected. The output gear 27 moves the both functional components 25 simultaneously in the front-and-rear direction by pushing and pulling the both drive belts 28 in response to a rotation. The upper surface of the output gear 27 and the upper surfaces of the both drive belts 28, which configure a drive member, are covered with the fixed panel 23.

Figure 3:
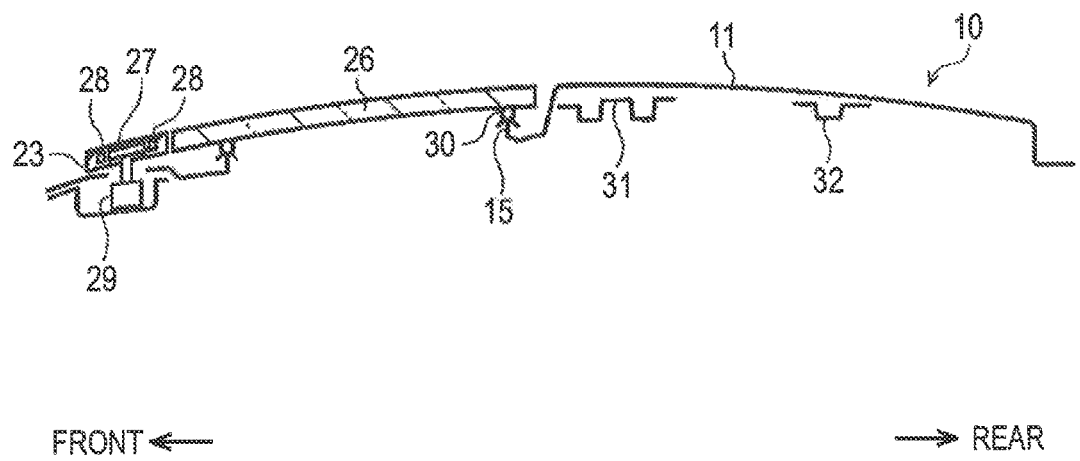
FIG. 3 is a sectional view taken along line 3-3 of FIG. 2.
Figure 4:
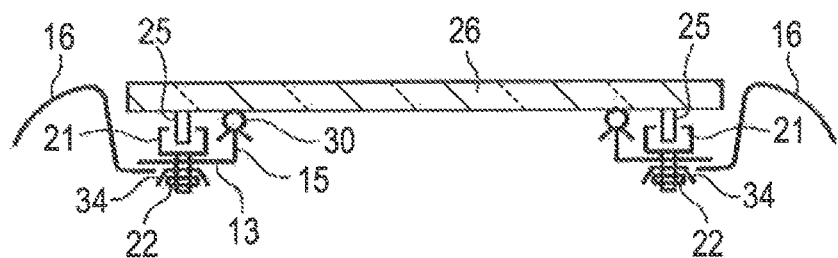
FIG. 4 is a sectional view taken along line 4-4 of FIG. 2.

As illustrated in FIG. 3, the output gear 27 is connected to an output shaft of an electric motor 29 disposed below the pedestal portion 13, and is rotation-driven by the electric motor 29. In addition, as illustrated in FIG. 4 as well, a weatherstrip 30, which is formed of an extruded member made of a synthetic rubber, for example, EPDM, or a thermoplastic elastomer, is attached to the entire periphery of the attaching wall 15. The weatherstrip 30 is elastically in contact with a lower surface of the movable panel 26 which is in a closed state.

As illustrated in FIG. 3, a reinforcement for side collision 31, which is formed of, for example, a metal plate, is attached to a lower surface of the roof panel 11 so as to be adjacent to a portion of the pedestal portion 13 close to the rear of the vehicle. The reinforcement for side collision 31 substantially extends over the entire length of the roof panel 11 in the width direction of the vehicle, is uneven in the height direction of the vehicle, and also extends in the front-and-rear direction. Thus, the reinforcement for side collision 31 increases the strength of the roof panel 11 at a time of vehicle side collision. In addition, a reinforcement for dent 32, which is formed of, for example, a metal plate, is attached to the lower surface of the roof panel 11 at a position closer to the rear of the vehicle than the reinforcement for side collision 31. The reinforcement for dent 32 has a substantially hat-shaped constant section, and extends over the substantially entire length of the roof panel 11 in the width direction of the vehicle, thereby reinforcing the roof panel 11.

Figure 5:
FIG. 5 is a sectional view, which corresponds to FIG. 3, illustrating a normal roof panel, in which a sunroof unit is not provided.

Herein, as illustrated in FIG. 5, the reinforcement for side collision 31 and the reinforcement for dent 32 are disposed identically and attached even to a normal roof panel 80 in which the sunroof unit 20 is not provided. In other words, the roof panels 11 and 80 have the same structure except for the presence or absence of the opening 12 or the like, and can be molded with the same material.

Figure 6:
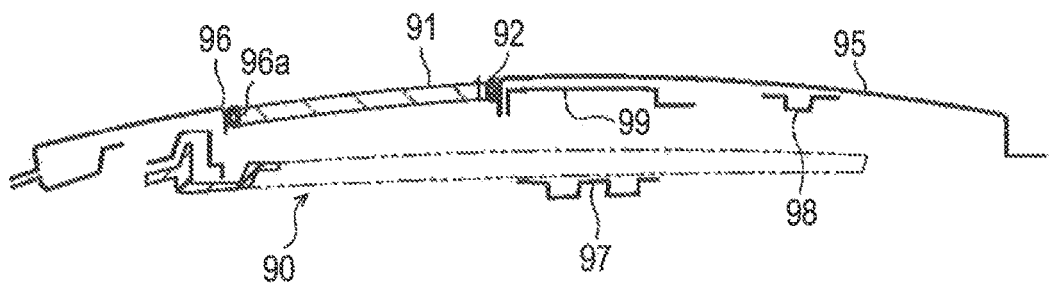
FIG. 6 is a longitudinal sectional view illustrating a structure of a roof apparatus in a form according to the related art.

As illustrated in FIG. 6, a large reinforcement 99 for reinforcing a peripheral portion of the opening 96 is added to the roof panel 95, in which the sunroof unit 90 is provided, of the related art while a reinforcement for side collision 97 and a reinforcement for dent 98, which are similar to the aforementioned reinforcement for side collision and reinforcement for dent, being left as they are but being disposed differently.

In addition, as illustrated in FIG. 4, a long bracket 34 formed of, for example, a metal plate, is interposed between each of both edge portions of the pedestal portion 13 in the width direction of the vehicle and the fixing tool 22. The bracket 34 is for increasing the fixing strength of the pedestal portion 13 and the guide rail 21.

Hereinafter, the operations of the embodiment and the effects thereof will be described.

(1) In the embodiment, the sunroof unit 20 has a configuration in which the both guide rails 21 are mounted on the both edge portions of the pedestal portion 13 in the width direction of the vehicle and the fixed panel 23 is mounted on the front edge portion of the pedestal portion 13. Therefore, assembling from above the vehicle is possible. In this case, by having an opening amount at which the opening 12 fits in the inner side of the movable panel 26 that is in a closed state, the entire opening 12 can be covered with the movable panel 26 from the above, and thus liquid tightness can be appropriately ensured.

In addition, by the output gear 27 and the both drive belts 28 (drive member) being covered with the fixed panel 23, excellence in design can be appropriately ensured.

(2) In general, the body structures of the roof apparatus (refer to FIG. 5) having a normal specification and the roof apparatus (refer to FIG. 6) having a sunroof specification are significantly different from each other, and thus investment costs grow. However, in this embodiment, investment costs can be considerably reduced without a need for adding a large component such as the reinforcement 99. Therefore, costs for optional features of cars having a sunroof specification can be reduced. The pedestal portion 13 plays a role of the reinforcement 99.

(3) In the embodiment, a structure of, for example, a draining device or the like can be simplified by having the so-called exterior sunroof unit 20 in which the guide rail 21 and the functional component 25 are positioned at the outer peripheral side of the weatherstrip 30.

(4) In the embodiment, the number of components can be reduced by the both guide rails 21 and the fixed panel 23 being directly mounted on the roof panel 11 (pedestal portion 13) compared to a case where the both guide rails 21 and the fixed panel 23 are mounted on the roof panel 11 through, for example, a separately-provided large frame, which integrates the both guide rails 21 and the fixed panel 23.

The aforementioned embodiment may be changed as follows.

In the embodiment, the fixed panel 23 is mounted on the front edge portion so as to be adjacent to the pedestal portion 13. However, the fixed panel 23 may be mounted, for example, on a front edge portion included in the pedestal portion 13.

In the embodiment, the fixed panel 23 may be mounted on a portion other than the front edge portion of the pedestal portion 13.

In the embodiment, the operation of opening and closing the opening 12 performed by the movable panel 26 may be a so-called outer-sliding type operation in which the movable panel 26 slides in a state of being tilted up, or may be a so-called inner-sliding type operation in which the movable panel 26 slides in a state of being tilted down.

A roof apparatus according to an aspect of this disclosure includes a roof panel in which an opening and a pedestal portion extending over an entire peripheral portion of the opening are formed and a sunroof unit, in which the sunroof unit has a pair of guide rails mounted on both edge portions of the pedestal portion in a width direction of a vehicle, a pair of functional components supported by the both guide rails so as to be capable of moving in a front-and-rear direction of the vehicle, a movable panel that is supported by the both functional components and opens and closes the opening in response to movements of the both functional components, and a fixed panel that connects both front ends of the both guide rails together in the width direction of the vehicle, is mounted so as to be adjacent to the movable panel which is in a closed state, and covers a drive member which drives and moves the both functional components.

In this configuration, the sunroof unit has a configuration, in which the both guide rails are mounted on the both edge portions of the pedestal portion in the width direction of the vehicle and the fixed panel is mounted, and thereby assembling from above the vehicle is possible. In this case, the movable panel can cover the entire opening from above and liquid tightness can be appropriately ensured by having the opening amount at which the opening fits in the inner side of the movable panel that is in a closed state. In addition, excellence in design can be appropriately ensured by the entire pedestal portion being covered from above with the movable panel that is in a closed state and the fixed panel together and the drive member being covered by the fixed panel.

In the roof apparatus described above, it is preferable that the fixed panel is mounted on a front edge portion of the pedestal portion so as to be adjacent to a portion of the movable panel close to the front of the vehicle.

The aspect of this disclosure provides an effect in which the sunroof unit can be assembled from above the vehicle.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A roof apparatus comprising:
   a roof panel in which an opening and a pedestal portion extending over an entire peripheral portion of the opening are formed; and
   an exterior sunroof unit,
   wherein the sunroof unit includes
      a pair of guide rails directly mounted on both edge portions of the pedestal portion in a width direction of a vehicle,
      a pair of functional components supported by the both guide rails so as to be capable of moving in a front-and-rear direction of the vehicle,
      a movable panel that is supported by the both functional components and opens and closes the opening in response to movements of the both functional components, and
      a fixed panel that connects both front ends of the both guide rails together in the width direction of the vehicle, is mounted so as to be adjacent to the movable panel which is in a closed state, and covers a drive member which drives and moves the both functional components.

2. The roof apparatus according to claim 1,
   wherein the fixed panel is mounted on a front edge portion of the pedestal portion so as to be adjacent to a portion of the movable panel close to the front of the vehicle.

3. The roof apparatus according to claim 1, further comprising:
   an attaching wall which substantially extends upwards over the entire periphery of the opening; and
   a weatherstrip attached to an entire periphery of the attaching wall,
   wherein the guide rails, the functional components, and the drive member are positioned at an outer peripheral side of the weatherstrip.

4. The roof apparatus according to claim 2,
   wherein the fixed panel is directly mounted on the front edge portion of the pedestal portion so as to be adjacent to the portion of the movable panel close to the front of the vehicle.

* * * * *